（12） United States Patent
Madsen

(10) Patent No.: US 7,376,356 B2
(45) Date of Patent: May 20, 2008

(54) OPTICAL DATA TRANSMISSION SYSTEM USING SUB-BAND MULTIPLEXING

(75) Inventor: Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 559 days.

(21) Appl. No.: 10/320,942

(22) Filed: Dec. 17, 2002

(65) Prior Publication Data

US 2004/0114929 A1 Jun. 17, 2004

(51) Int. Cl.
*H04B 10/04* (2006.01)
(52) U.S. Cl. .................. 398/183; 398/187; 398/188
(58) Field of Classification Search .............. 398/65, 398/85, 116, 182–189, 196, 198
See application file for complete search history.

(56) References Cited

U.S. PATENT DOCUMENTS

| 5,774,505 | A | * | 6/1998 | Baugh ................. 375/348 |
| 6,081,358 | A | * | 6/2000 | Tiemann et al. ............ 398/1 |
| 6,427,068 | B1 | * | 7/2002 | Suominen ............... 455/302 |
| 6,714,652 | B1 | * | 3/2004 | Davis et al. .............. 381/17 |
| 6,825,966 | B2 | * | 11/2004 | Webb et al. .............. 359/279 |
| 2002/0131662 | A1 | * | 9/2002 | Strutz et al. ............... 385/1 |
| 2003/0076567 | A1 | * | 4/2003 | Matthews et al. ........ 359/181 |
| 2004/0208644 | A1 | * | 10/2004 | Sirat et al. .............. 398/186 |

OTHER PUBLICATIONS

Betti, S. et al.: "Multilevel Coherent Optical System Based on Stokes Parameters Modulation," Journal of Lightwave Technology, vol. 8, No. 7, Jul. 1990.

* cited by examiner

*Primary Examiner*—Dzung Tran

(57) ABSTRACT

In accordance with the invention, an optical data transmission system of enhanced flexibility is provided by sub-band multiplexing of a WDM channel. Specifically, an exemplary optical data transmission system comprises an optical source for generating a plurality of frequency spaced optical tones within at least one WDM channel, a plurality of modulators for modulating the tones, and an optical transmission fiber for receiving and transmitting the modulated tones. An advantage of this system is that the tones are coherent. As a consequence, the need for guard bands is substantially reduced, and more flexible coding systems can be used to achieve a higher level of integration. For example, both amplitude and phase coding can be applied to the sub-band signals.

40 Claims, 5 Drawing Sheets

OPTICAL DATA TRANSMISSION SYSTEM USING SUB-BAND MULTIPLEXING

FIELD OF THE INVENTION

This invention relates to optical data transmission systems, and in particular to a data transmission system using sub-band multiplexing to further multiplex at least one wavelength division multiplex (WDM) system channel.

BACKGROUND OF THE INVENTION

Optical transmission systems have evolved to multiplexed systems that transmit a plurality of optical main carrier channels on a single optical fiber transmission line, as in wavelength division multiplexing (WDM) or dense WDM (DWDM). While each WDM channel is capable of transmitting large volumes of data at very high speeds, channel bandwidths are often underutilized by relatively slow data streams.

Subcarrier modulation has been successfully used in radio frequency (RF) transmissions to combine both digital and analog information onto a main carrier frequency transmission. Typically RF subcarriers are created at fixed frequency intervals from the center frequency of the main RF channel. Lower bandwidth information can then be coded or modulated onto the subcarriers and thus fill the sub-band channels. A main carrier transmission can include a plurality of subcarriers, with their associated sub-bands.

WDM channel bandwidth capacity could be used far more efficiently by the addition of optical sub-bands. But, while there are similarities in the underlying fundamental modulation theory between electrical RF subcarrier systems and optical subcarrier systems, the technology for implementing optical subcarriers and sub-bands is quite different and heretofore has been unavailable. An optical apparatus for adding optical subcarriers to main WDM optical carriers is needed.

SUMMARY OF THE INVENTION

In accordance with the invention, an optical data transmission system of enhanced flexibility is provided by sub-band multiplexing of a WDM channel. Specifically, an exemplary optical data transmission system comprises an optical source for generating a plurality of frequency spaced optical tones within at least one WDM channel, a plurality of modulators for modulating the tones, and an optical transmission fiber for receiving and transmitting the modulated tones. An advantage of this system is that the tones are coherent. As a consequence, the need for guard bands is substantially reduced, and more flexible coding systems can be used to achieve a higher level of integration. For example, both amplitude and phase coding can be applied to the sub-band signals.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIG. 1 is a block diagram showing a wavelength division multiplexed (WDM) optical data transmission system using a sub-band multiplexing scheme;

It is to be understood that the drawings are for the purpose of illustrating the concepts of the invention, and except for the graphs, are not to scale.

DESCRIPTION

Wavelength division multiplexed (WDM) and dense WDM (DWDM) networks combine many channels of optical transmission channels at different main carrier wavelengths (WDM channels). In some networks, particularly for short haul applications, it can be more efficient to further divide individual high capacity channels (Gb/s transmissions) into smaller sub-bands about subcarrier wavelengths on a main channel carrier.

One possible approach would be to assemble data streams from independent sources onto an electrical carrier frequency as RF subcarriers. Then the composite RF signal, including a carrier and RF subcarriers, could be converted to light for transmission as optical data. But this method is undesirable, because large power excursions in the combined signals can cause amplifier saturation and signal clipping which would produce distortion. Also, in standard RF subcarrier modulation, the modulation bandwidth and detector bandwidths are large, forcing one to continuously work with all subchannels simultaneously.

In accordance with the invention, signal clipping and associated distortion are avoided by first creating a channel's subcarriers in light and then encoding the subcarriers with data. This fills the sub-bands. We describe herein an optical apparatus and method for creating and loading light wave subcarriers with data streams from various sources. The technique works well with digital data transmission systems and can also be used with analog data streams.

Figure 1B:
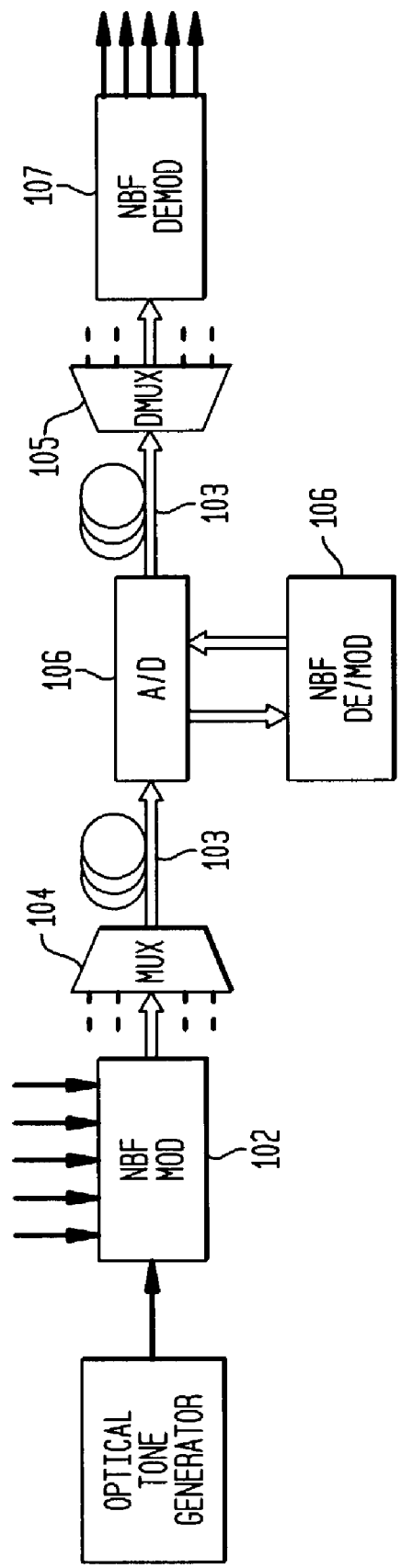
FIG. 1B is an inset drawing on FIG. 1, showing the sub-bands resulting after the individual subcarriers are modulated by narrow band filters (NBF)
Figure 1B:
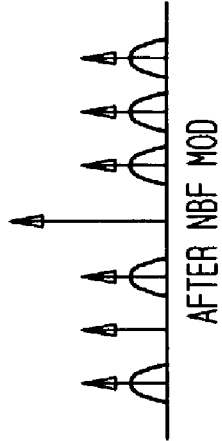
Figure 1A:
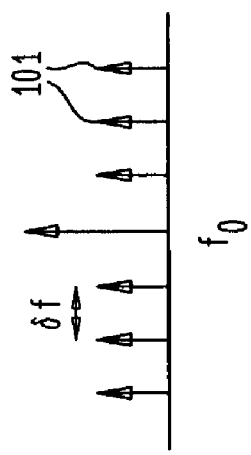
FIG. 1A is an inset drawing on FIG. 1, showing the added optical subcarriers as a comb of tones spaced at intervals of δf about center frequency $f_0$.

FIG. 1 shows a WDM optical data transmission system following the inventive method to create optical subcarriers. The system comprises optical subcarriers 101, for transmission over optical transmission path 103 (which can be optical fiber, or transmission of light through free space), narrow band magnitude and/or phase modulators are cascaded in a single waveguide 102 (instead of splitting the tones into separate output waveguides). Each filter stage modulates one tone. The wavelength multiplexer 104 combines a plurality of main channel wavelengths, some or all of which now contain modulated subcarriers. The composite light signal containing all of the channels combined by multiplexer 104 is then transmitted over optical transmission line 103. Wavelength demultiplexer 105 receives and separates the main channels at the receiving end of transmission line 103. Add/Drop system 106 allows for the selection of subcarrier signals and is discussed later as FIG. 5. Finally, each demodulator 107 (one is shown) demodulate the subcarrier signals carried by each WDM main channel. The subcarrier signals can be analog or digital, but are most likely digital data streams. Since the subcarriers are at a lower data rate, multilevel transmission can be more easily implemented allowing more bits/second to be transmitted on each subcarrier.

If more capacity is desired, polarization multiplexing can also be introduced at the sub band level. (See Betti, et al, *Multilevel coherent optical system based on Stokes parameters modulation*, Institute of Electrical and Electronic Engineers (IEEE), Journal of Lightwave Technology vol. 8, no. 7, p. 1127 (1990). for multi-level polarization multiplexing and demultiplexing architectures.) Sub-band polarization multiplexing can be implemented with amplitude and phase modulators and polarization beam splitters and combiners as proposed in this patent.

Figure 2:
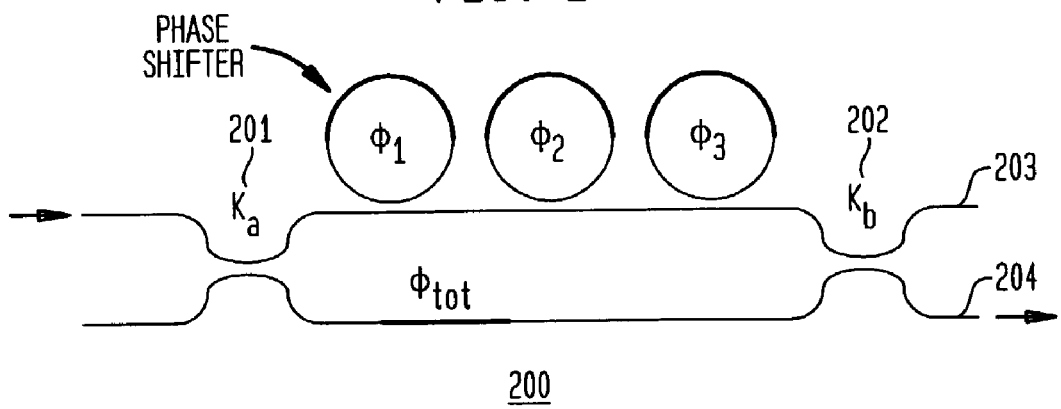
FIG. 2 shows a schematic diagram of a series of narrowband amplitude modulators.
Figure 4:
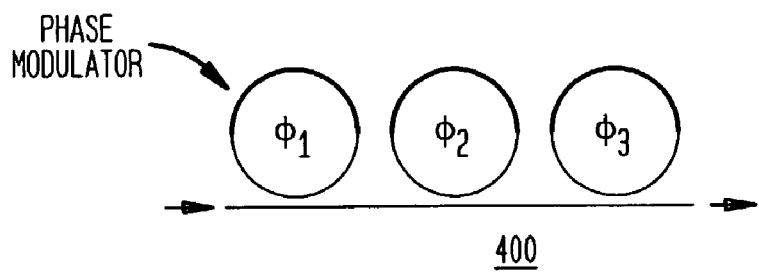
FIG. 4 shows a series of three cascaded narrowband phase modulators.

Exemplary magnitude modulators 200 are shown in FIG. 2, and phase modulators 400 are shown in FIG. 4. Both are advantageously based on optical feedback interference filters such as optical allpass filters (APF) and employ phase shifters to tune the response. Optical feedback interference filters comprise an interference component and an optical feedback path that returns a portion of the output light to an input port. An APF exhibits a magnitude response of 1, but shifts the phase of the input signal near a predetermined wavelength. Such filters are easily implemented in planar waveguides using ring resonators. Phase shifters may be thermo-optic in silica waveguides or electro-optic in semiconductor, polymer or lithium niobate waveguides. Electro-optic phase shifters allow much higher modulation rates, GHz or higher, compared to thermo-optic modulators which are restricted to sub-MHz rates. The modulators may work on each tone independently, or in pairs or larger groups. The narrowband amplitude modulator 400 shown in FIG. 4 is advantageous because the couplers which form the Mach-Zehnder interferometer (MZI) can be chosen to compensate for the ring loss in such a manner that very high extinction ratios are obtainable as indicated in the example spectral response. In addition, many modulators are easily cascaded into a common output, unlike architectures using a single ring with separate input/output waveguides for each channel.

Once the allpass filter roundtrip loss is known, the exact values for $\kappa_a$ 201 and $\kappa_b$ 202 are calculated. These coupling ratios can be precisely realized with symmetric MZIs using thermo-optic phase shifters to set the effective coupling ratios without incurring a fabrication yield penalty, while faster electro-optic phase shifters are used for modulation purposes.

Figure 3:
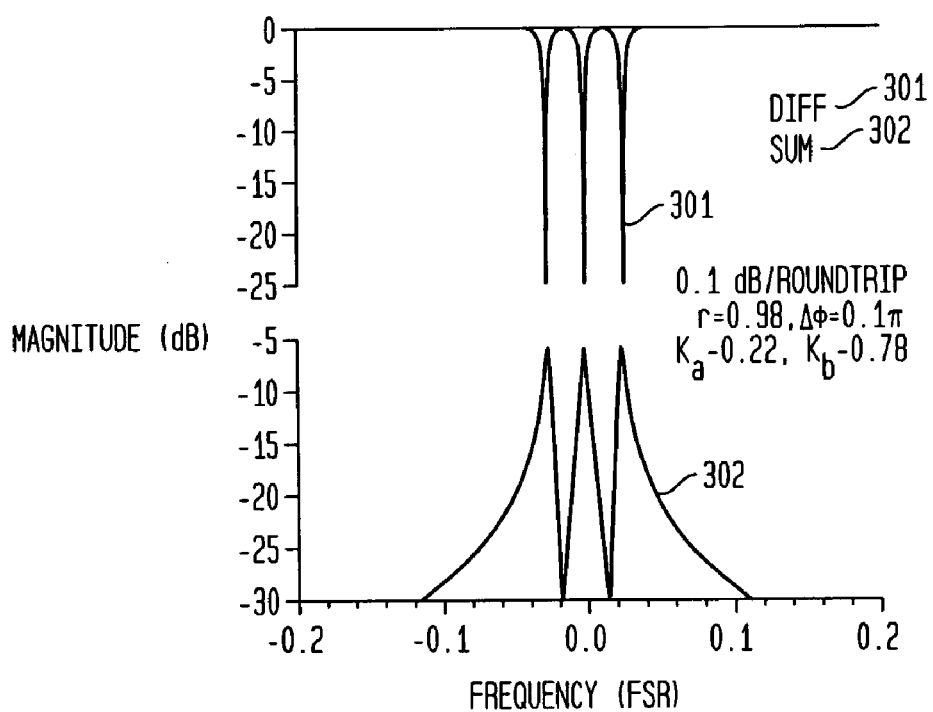
FIG. 3 shows the spectral response for the top and bottom waveguide outputs of the modulators of FIG. 2.

FIG. 3 shows the spectral response for a representative narrow band amplitude modulator of FIG. 2. The two plots 301 and 302 show spectrum of the output signals at the top output 203 and the bottom output 204 respectively.

Figure 7A:
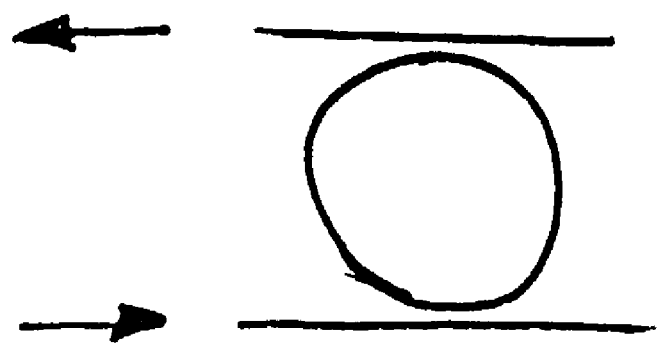
FIG. 7A shows a single stage ring resonator for use in optical subband demultiplexing.
Figure 7B:
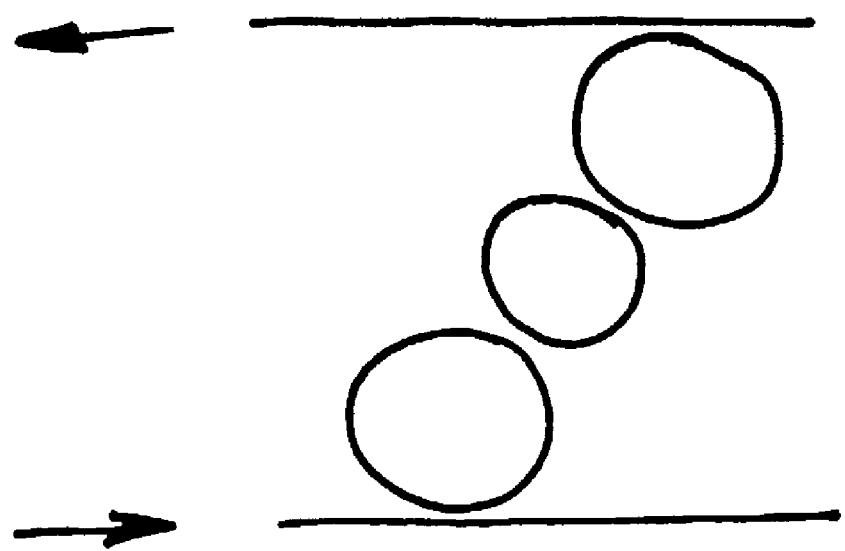
FIG. 7B shows a higher order ring resonator with coupled rings for use in optical subband demultiplexing.

The demodulator architecture will depend on the particular modulation scheme chosen (for example, involving tone singlets, doublets, or the full tone spectrum) and will consist of combinations of the amplitude and phase modulators shown in FIGS. 2 and 4. Standard demodulators based on ring resonators are suitable; however they could also be Mach Zehnder or arrayed cavity waveguide grating router based. Typical sections are shown in FIGS. 7A to 7D. A single stage ring resonator is shown in FIG. 7A, a higher order ring resonator with coupled rings is shown in FIG. 7B.

Figure 7C:
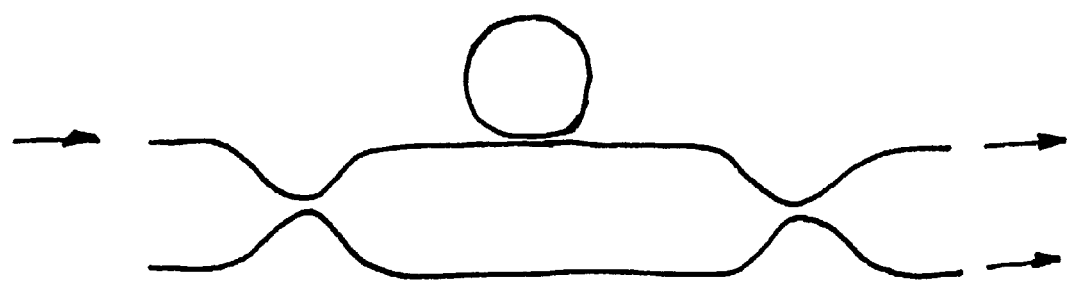
FIG. 7C shows a single stage Mach Zehnder device with ring for use in optical subband demultiplexing.
Figure 7D:
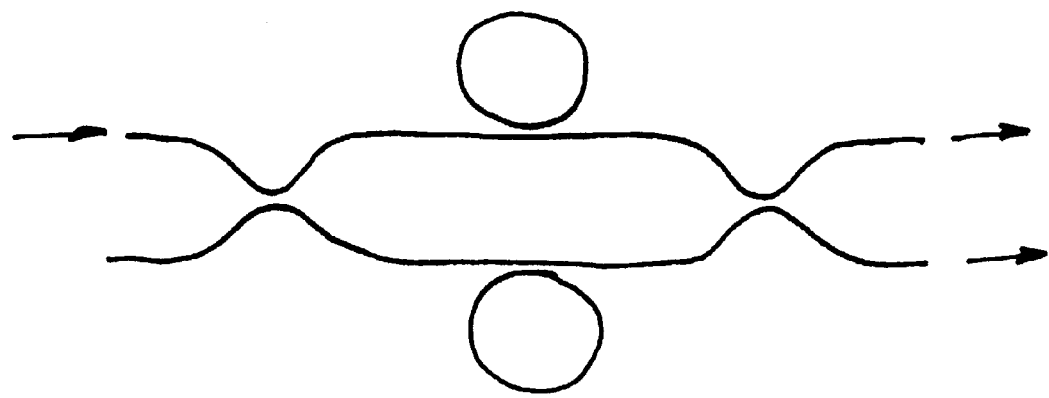
FIG. 7D shows a multi stage Mach Zehnder device with rings for use in optical subband demultiplexing.

Single and multistage Mach Zehnder devices with rings are shown in FIGS. 7C and 7D. In these devices, the specific output depends on the relative phase between the arms. They can drop to the top or to the bottom output ports.

Synchronization of the narrowband filters to the carrier and tone spacing can be important in such demodulators. Other useful topologies suitable for subband demodulation applications are described in U.S. Patent application Ser. No. 10/180,842, "Apparatus and Method for Measurement and Adaptive Control of Polarization Mode Dispersion in Optical Fiber Communication Systems" which is incorporated herein by reference.

Figure 5:
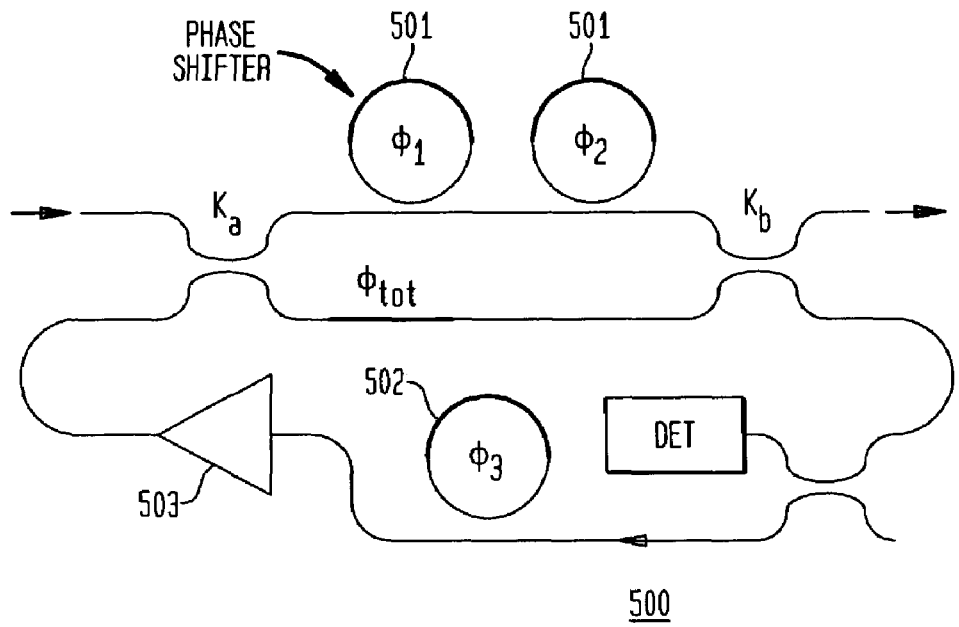
FIG. 5 shows a narrowband drop/add circuit with a detector, modulator, and optical amplifier; and, FIG. 6 shows a simulation of an all pass filter (APF) phase modulator.

An add-drop filter 500 is shown in FIG. 5 with two-tone demodulation 501, single-tone phase modulation 502 and an integrated optical amplifier 503. For two-tone demodulation, one tone could carry both phase and amplitude information while the other tone is a reference. Then, the reference tone could be phase (and/or amplitude) modulated for the add signal. It is critical in the narrowband demodulators that the filters be polarization independent since the incoming polarization is uncontrolled. For planar waveguide implementations, polarization diversity may be employed using polarization beam splitters on-chip until the waveguide birefringence can be eliminated.

An etalon is a narrow band, low loss, low distortion Fabry Perot optical filter. A Drop/add filter based on an etalon approach would be polarization independent, narrowband and tunable. Since the data-rate on each sub-channel is substantially smaller than the overall channel capacity, the dispersion tolerance, whether to polarization mode or chromatic dispersion, is greatly improved. For example, the chromatic dispersion tolerance is known to scale inversely to the square of the bit rate. For a sub-channel rate which is $\frac{1}{8}^{th}$ of the overall channel capacity, the tolerance is improved by a factor of 64.

EXAMPLE

Narrowband filter locking to a carrier wavelength and to a sideband via RF tone locking was demonstrated in the lab with optical filters having a sub-GHz bandwidth. Thermo-optic phase shifters were used to dither the filter response and provide the locking signal. Advantageously, the locking signal would not respond to a high frequency modulation on the tone. This modulation would, however, be subsequently picked up by a detector with the appropriate bandwidth.

Figure 6:
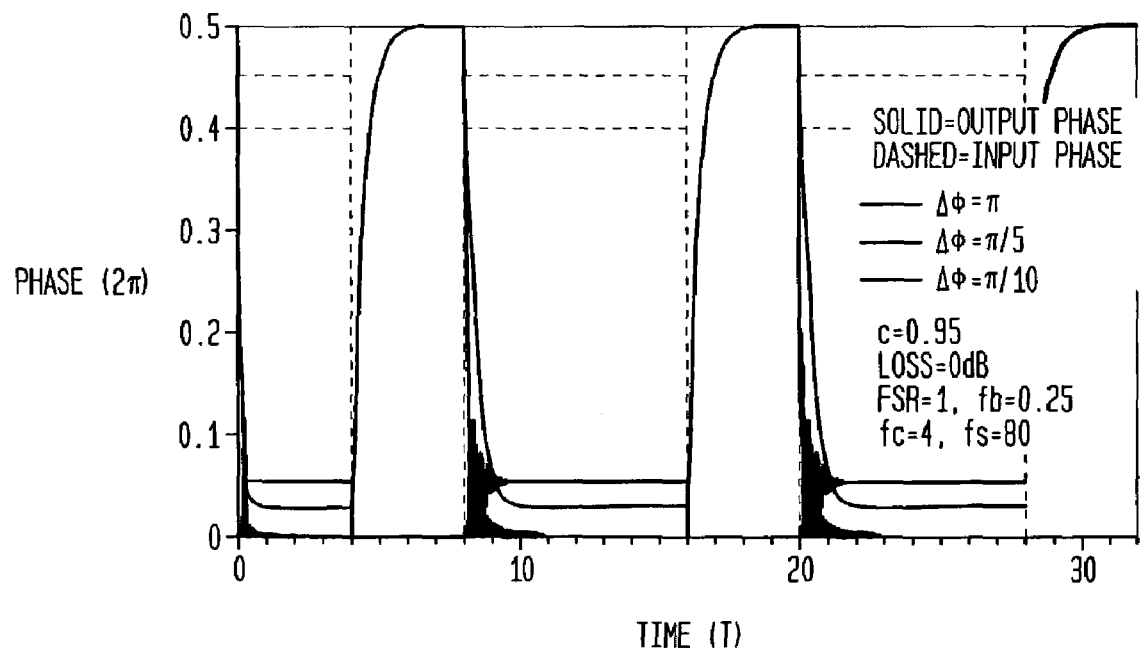

Also, a simulation of an APF phase modulator is shown in FIG. 6. The pole value is 0.95 and the relative period of the bit to the APF unit delay is only 4. While low pass filtering of the output phase is evident, it demonstrates phase shift keying. In addition, a full n phase change is not necessary to get good differentiation between two phases. Simulations are also shown for input phase changes of $\pi/5$ and $\pi/10$.

It can now be seen that this invention includes an optical data network using subcarrier modulation. It comprises a light source configured to generate both a center channel wavelength and a set of subcarriers about the center channel wavelength. A subcarrier modulator can be optically coupled to the light source. The subcarrier modulator can be configured to modulate one or more data streams onto at least one of the subcarrier sub-bands, and an optical transmission path can be optically coupled to the subcarrier modulator.

The optical transmission path can be configured to transmit the subcarrier modulated light signal, and a subcarrier demodulator can be optically coupled to the optical transmission path, the subcarrier demodulator configured to demodulate the modulated sub-bands. The optical transmission path can be an optical fiber or free space. The subcarriers can be equally spaced tones.

The modulator can comprise an optical feedback interference filter, and can further comprise an optical all pass filter. The demodulator can comprise an optical feedback interference filter, or an optical all pass filter.

The center channel wavelength can be a wavelength division multiplexed channel. And, one or more of the subcarrier modulators can comprise a phase modulator.

Subcarrier modulators can further comprise a polarization multiplexer, the polarization multiplexer configured to assign each incoming data stream into a unique polarization on the optical subcarrier. Corresponding subcarrier demodulators further comprise a polarization demultiplexer, the polarization demultiplexer configured to separate each data stream by its polarization from the optical subcarrier while demodulating the optical subcarrier.

Subcarrier modulation can be amplitude modulation, phase modulation, or both amplitude and phase modulation.

A typical optical data network, such as a WDM or DWDM network, can have a plurality of optical channel transmitters to transmit a plurality of center channel wavelengths. A wavelength multiplexer can be configured for combining and transmitting a composite light signal comprising the center channel wavelengths. An optical transmission path optically coupled to the output of the wavelength multiplexer, the optical transmission path can then be configured for transmitting the composite light signal.

A wavelength demultiplexer optically coupled to the optical transmission path downstream of the wavelength multiplexer can be configured for receiving the composite light signal and separating the center channel wavelengths and directing each center channel wavelength to a channel output; and a plurality of optical channel receivers, the optical channel receivers optically can be coupled to the channel outputs.

In such as a network as just described, at least one of the optical channel transmitters can comprise a subcarrier modulated optical channel transmitter. The transmitter can have a light source configured to generate both a center channel wavelength and a set of subcarriers about the center channel wavelength, and a subcarrier modulator optically coupled to the light source, the subcarrier modulator configured to modulate one or more data streams onto at least one of the subcarrier sub-bands. And, at least one of the optical channel receivers can comprise a subcarrier modulated optical channel receiver comprising a subcarrier demodulator configured to demodulate the sub-bands.

The optical transmission path for the network can comprise optical fiber or the optical signal can be transmitted in free space.

The subcarriers can be equally spaced tones. The modulator can comprise an optical feedback interference filter, or an optical all pass filter. The demodulator can comprise an optical feedback interference filter or an optical all pass filter.

The center channel wavelength can be the wavelength of a wavelength division multiplexed channel. The subcarrier modulator can comprise a phase modulator. It can further comprise a polarization multiplexer, the polarization multiplexer configured to assign each incoming data stream into a unique polarization on the optical subcarrier. And the subcarrier demodulator further comprises a polarization demultiplexer, the polarization demultiplexer configured to separate each data stream by its polarization from the optical subcarrier while demodulating the optical subcarrier. The subcarrier modulator can modulate both phase and amplitude.

An optical data transmitter can advantageously use subcarrier modulation comprising a light source configured to generate both a center channel wavelength and a set of subcarriers about the center channel wavelength. The subcarrier modulator can be optically coupled to the light source, and the subcarrier modulator configured for modulating one or more data streams onto at least one of the subcarrier sub-bands. And, the filter can be an optical feedback interference filter or an optical all pass filter. The subcarrier modulator can comprise a phase modulator. And the optical data transmitter with subcarrier modulator can further comprise a polarization multiplexer configured to assign each incoming data stream into a unique polarization on the optical subcarrier. The subcarrier modulator can modulate amplitude or both amplitude and phase.

An optical data receiver using subcarrier modulation can comprise a subcarrier demodulator having modulators. The subcarrier demodulator can be optically coupled to the wavelength demultiplexer, and the subcarrier demodulator can be configured for demodulating the sub-bands and outputting data. The modulators can be amplitude and phase modulators. The demodulator can comprises an optical all pass filter or an optical feedback interference filter. And, the subcarrier demodulator can comprise a polarization demultiplexer configured to separate each data stream by its polarization from the optical subcarrier while demodulating the optical subcarrier.

This is a method of optically transmitting and receiving information comprising the steps of generating a central wavelength optical carrier composed of a plurality of subcarriers spaced about the central wavelength; modulating one or more of the subcarriers with modulation signals; transmitting the central wavelength optical carrier over an optical transmission path; receiving the central wavelength optical carrier; and demodulating the subcarriers to recover the subcarrier modulation signals.

The optical transmission path can comprise an optical fiber transmission path or free space. The set of subcarriers can comprise a set of optical tones. Modulation of the subcarriers can comprise modulating the signal onto at least one subcarrier using an optical all pass filter. Demodulating the subcarriers can comprise demodulating the signal from at least one subcarrier using an optical all pass filter. The central wavelength can comprise generating a plurality of central wavelength optical carriers; and combining the plurality of central wavelength optical carriers to form a composite light wave, wherein the central wavelength constitutes a channel of a wavelength division multiplexed system.

We claim:

1. An optical data network that uses subcarrier modulation comprising:

a light source configured to generate light at both a center channel wavelength and a set of subcarriers about the center channel wavelength;

a subcarrier modulator optically coupled to the light source, the subcarrier modulator having multiple modulators cascaded in a single planar waveguide to modulate data streams onto more than one of the subcarriers to produce a subcarrier modulated light signal;

an optical transmission path optically coupled to the subcarrier modulator, the optical transmission path configured to transmit the subcarrier modulated light signal; and a subcarrier demodulator optically coupled to the optical transmission path, the subcarrier demodulator configured to demodulate the subcarrier modulated light signal.

2. An optical data network according to claim 1 wherein the optical transmission path comprises optical fiber.

3. An optical data network according to claim 1 wherein the optical transmission path comprises free space.

4. An optical data network according to claim 1 wherein the subcarriers comprise equally spaced tones.

5. An optical data network according to claim 1 wherein the modulator comprises an optical feedback interference filter.

6. An optical data network according to claim 1 wherein the modulator comprises an optical all pass filter.

7. An optical data network according to claim 1 wherein the demodulator comprises an optical feedback interference filter.

8. An optical data network according to claim 1 wherein the demodulator comprises an optical all pass filter.

9. An optical data network according to claim 1 wherein the multiple modulators cascaded in a single planar waveguide comprise phase modulators.

10. An optical data network according to claim 1 wherein the subcarrier modulator further comprises a polarization multiplexer configured to assign each incoming data stream into a unique polarization on the optical subcarrier.

11. An optical data network according to claim 1 wherein the subcarrier demodulator comprises a polarization demultiplexer configured to separate each data stream by its polarization from the optical subcarrier while demodulating the optical subcarrier.

12. An optical data network according to claim 1 wherein the subcarrier modulator modulates amplitude.

13. An optical data network according to claim 1 wherein the subcarrier modulator modulates both amplitude and phase.

14. An optical data network having:
one or more optical channel transmitters to transmit light at a plurality of center channel wavelengths;
a wavelength multiplexer configured for combining light at the center channel wavelengths into a composite signal and transmitting the composite signal;
an optical transmission path optically coupled to the output of the wavelength multiplexer, the optical transmission path configured for transmitting the composite light signal;
a wavelength demultiplexer optically coupled to the optical transmission path downstream of the wavelength multiplexer, the wavelength demultiplexer configured for receiving the composite signal, separating light at the center channel wavelengths, and directing each center channel wavelength to a channel output; and
a plurality of optical channel receivers optically coupled to the channel outputs; the optical data network CHARACTERIZED IN THAT:
at least one of the optical channel transmitters comprises a subcarrier modulated optical channel transmitter comprising a light source configured to generate light at both a center channel wavelength and at a set of subcarriers about the center channel wavelength, and a subcarrier modulator optically coupled to the light source, the subcarrier modulator having multiple modulators cascaded in a single planar waveguide to modulate data streams onto more than one of the subcarriers; and
at least one of the optical channel receivers comprises a subcarrier modulated optical channel receiver comprising a subcarrier demodulator configured to demodulate the subcarriers.

15. An optical data network according to claim 14 wherein the optical transmission path comprises optical fiber.

16. An optical data network according to claim 14 wherein the optical transmission path comprises free space.

17. An optical data network according to claim 14 wherein the subcarriers comprise equally spaced tones.

18. An optical data network according to claim 14 wherein the modulator comprises an optical feedback interference filter.

19. An optical data network according to claim 14 wherein the multiple modulators cascaded in a single planar waveguide comprise optical all pass filters.

20. An optical data network according to claim 14 wherein the demodulator comprises an optical feedback interference filter.

21. An optical data network according to claim 14 wherein the demodulator comprises, an optical all pass filter.

22. An optical data network according to claim 14 wherein the center channel wavelength comprises a wavelength division multiplexed channel.

23. An optical data network according to claim 14 wherein the multiple modulators cascaded in a single planar waveguide comprise a phase modulators.

24. An optical data network according to claim 14 wherein the subcarrier modulator further comprises a polarization multiplexer configured to assign each incoming data stream a unique polarization on the optical subcarrier.

25. An optical data network according to claim 14 wherein the subcarrier demodulator further comprises a polarization demultiplexer configured to separate each data stream by its polarization from the optical subcarrier while demodulating the optical subcarrier.

26. An optical data network according to claim 14 wherein the subcarrier modulator modulates amplitude.

27. An optical data network according to claim 14 wherein the subcarrier modulator modulates both amplitude and phase.

28. An optical data transmitter using subcarrier modulation comprising:
a light source configured to generate both a center channel wavelength and a set of subcarriers about the center channel wavelength; and
a subcarrier modulator optically coupled to the light source, the subcarrier modulator having multiple modulators cascaded in a single planar waveguide to modulate data streams onto more than one of the subcarriers.

29. An optical data transmitter according to claim 28 wherein the multiple modulators cascaded in a single planar waveguide comprise optical feedback interference filters.

30. An optical data transmitter according to claim 28 wherein the multiple modulators cascaded in a single planar waveguide comprise optical all pass filters.

31. An optical data transmitter according to claim 28 wherein the multiple modulators cascaded in a single planar waveguide comprise phase modulators.

32. An optical data transmitter according to claim 28 wherein the subcarrier modulator further comprises a polarization multiplexer configured to assign each incoming data stream a unique polarization.

33. An optical data transmitter according to claim 28 wherein the subcarrier modulator modulates amplitude.

34. A method of optically transmitting and receiving information comprising the steps of:
- generating a central wavelength optical carrier composed of a plurality of subcarriers spaced about the central wavelength;
- modulating multiple subcarriers with modulation signals utilizing multiple modulators cascaded in a single planar waveguide;
- transmitting the central wavelength optical carrier over an optical transmission path;
- receiving the central wavelength optical carrier; and
- demodulating the subcarriers to recover the subcarrier modulation signals.

35. The method of optically transmitting and receiving information of claim wherein the optical transmission path comprises an optical fiber transmission path.

36. The method of optically transmitting and receiving information of claim 34 wherein the optical transmission path comprises free space.

37. The method of claim 34 wherein the set of subcarriers comprises a set of optical tones.

38. The method of claim 34 wherein modulating the multiple subcarriers with modulation signals further comprises using optical all pass filters.

39. The method of claim 34 wherein demodulating the subcarriers comprises demodulating the signal from at least one subcarrier using an optical all pass filter.

40. The method of claim 34 wherein:
- generating the central wavelength comprises generating a plurality of central wavelength optical carriers; and
- combining the plurality of central wavelength optical carriers to form a composite light wave, wherein the central wavelength constitutes a channel of a wavelength division multiplexed system.

* * * * *